US012771667B2

(12) United States Patent
McKim

(10) Patent No.: US 12,771,667 B2
(45) Date of Patent: *Oct. 20, 2026

(54) SYSTEMS AND METHODS FOR AUTOMATIC INTERNET PROTOCOL ADDRESS MANAGEMENT

(71) Applicant: State Farm Mutual Automobile Insurance Company, Bloomington, IL (US)

(72) Inventor: Grant McKim, Afton, WY (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 102 days.

This patent is subject to a terminal disclaimer.

(21) Appl. No.: 18/815,338

(22) Filed: Aug. 26, 2024

(65) Prior Publication Data

US 2024/0422124 A1 Dec. 19, 2024

Related U.S. Application Data

(63) Continuation of application No. 17/862,045, filed on Jul. 11, 2022, now Pat. No. 12,113,769, which is a (Continued)

(51) Int. Cl.
*H04L 61/5007* (2022.01)
*H04L 61/5061* (2022.01)
*H04L 101/695* (2022.01)

(52) U.S. Cl.
CPC ...... *H04L 61/5007* (2022.05); *H04L 61/5061* (2022.05); *H04L 2101/695* (2022.05)

(58) Field of Classification Search
CPC ........... H04L 2101/695; H04L 61/5007; H04L 61/5061
(Continued)

(56) References Cited

U.S. PATENT DOCUMENTS 7,633,948 B2 12/2009 Yokomitsu et al.
7,685,317 B2 3/2010 Iyer
(Continued)

FOREIGN PATENT DOCUMENTS

CA 2720142 C 7/2016
CN 1635805 A 7/2005
(Continued)

OTHER PUBLICATIONS

English machine-translation of CN-106487807-A, pp. 1-10 (Mar. 8, 2017) (Year: 2017).*

*Primary Examiner* — David P Zarka
(74) *Attorney, Agent, or Firm* — Armstrong Teasdale LLP

(57) ABSTRACT

A system and method for automatic IP address range allocation is provided. The system and method include a) storing an availability map of IP addresses including a pointer to a next available IP address range of a first size, b) receiving, from a requestor computer device, a request for an IP address range of the first size, c) selecting the next available IP address range of the first size based on the pointer, d) moving the pointer to another available IP address range of the first size, e) placing the selected IP address range of the first size in a quarantine pool, and f) transmitting, to the requestor computer device, the selected IP address range of the first size.

20 Claims, 6 Drawing Sheets

Related U.S. Application Data continuation of application No. 17/315,113, filed on May 7, 2021, now Pat. No. 11,456,987.

(58) Field of Classification Search
USPC .......................................................... 709/245
See application file for complete search history.

(56) References Cited

U.S. PATENT DOCUMENTS

| | | | | |
|---|---|---|---|---|
| 8,060,706 | B2 | 11/2011 | Wu | |
| 8,073,972 | B2 | 12/2011 | Jansen et al. | |
| 8,194,537 | B2 * | 6/2012 | Nomi | H04L 61/5084 370/402 |
| 8,213,393 | B2 | 7/2012 | Suganthi et al. | |
| 8,707,323 | B2 | 4/2014 | Galchev et al. | |
| 8,707,353 | B2 | 4/2014 | Nakagawa | |
| 8,775,629 | B1 | 7/2014 | Whittle | |
| 8,868,710 | B2 | 10/2014 | Schultze et al. | |
| 8,988,985 | B2 | 3/2015 | Kini et al. | |
| 9,065,863 | B1 | 6/2015 | Tharakan et al. | |
| 9,197,538 | B2 | 11/2015 | Hopen et al. | |
| 9,396,138 | B2 * | 7/2016 | Bello | G06F 3/0689 |
| 9,497,159 | B2 | 11/2016 | Bazin et al. | |
| 9,667,486 | B2 | 5/2017 | Gokhale et al. | |
| 9,813,374 | B1 | 11/2017 | Magerramov et al. | |
| 9,930,003 | B2 | 3/2018 | Amishav et al. | |
| 10,324,701 | B1 | 6/2019 | Stickle et al. | |
| 10,469,314 | B2 | 11/2019 | Ennis, Jr. et al. | |
| 10,608,942 | B1 | 3/2020 | Shaikh | |
| 10,652,207 | B2 | 5/2020 | Voss et al. | |
| 10,728,828 | B2 | 7/2020 | Wei | |
| 10,838,726 | B1 | 11/2020 | Peng et al. | |
| 11,456,987 | B1 * | 9/2022 | McKim | H04L 61/5007 |
| 12,113,769 | B2 * | 10/2024 | McKim | H04L 61/5007 |
| 2002/0158900 | A1 | 10/2002 | Hsieh et al. | |
| 2005/0154762 | A1 | 7/2005 | Wang | |
| 2005/0201302 | A1 | 9/2005 | Gaddis et al. | |
| 2007/0002833 | A1 | 1/2007 | Bajic | |
| 2008/0182573 | A1 | 7/2008 | Lauer et al. | |
| 2008/0298237 | A1 | 12/2008 | Dos Remedios et al. | |
| 2009/0164668 | A1 | 6/2009 | Duckett | |
| 2013/0272304 | A1 | 10/2013 | Kamble et al. | |
| 2014/0351547 | A1 | 11/2014 | Dietterich et al. | |
| 2015/0334696 | A1 | 11/2015 | Gu et al. | |
| 2016/0301658 | A1 * | 10/2016 | Borkar | H04L 61/00 |
| 2016/0352680 | A1 | 12/2016 | Elsharif et al. | |
| 2020/0236047 | A1 | 7/2020 | Hira et al. | |
| 2020/0257519 | A1 | 8/2020 | Shen et al. | |
| 2020/0314058 | A1 | 10/2020 | Adamski et al. | |
| 2020/0358651 | A1 | 11/2020 | Brandwine et al. | |

FOREIGN PATENT DOCUMENTS

| | | | | | |
|---|---|---|---|---|---|
| CN | 100493102 | C | | 5/2009 | |
| CN | 101098347 | B | | 2/2011 | |
| CN | 102307246 | A | | 1/2012 | |
| CN | 101534329 | B | | 5/2012 | |
| CN | 103051643 | A | | 4/2013 | |
| CN | 103581324 | A | | 2/2014 | |
| CN | 103984575 | A | | 8/2014 | |
| CN | 104394232 | A | | 3/2015 | |
| CN | 103281407 | B | | 4/2016 | |
| CN | 106059888 | A | | 10/2016 | |
| CN | 106487807 | A | * | 3/2017 | H04L 61/4511 |
| CN | 106598813 | A | | 4/2017 | |
| CN | 106878484 | A | | 6/2017 | |
| CN | 107071083 | A | | 8/2017 | |
| CN | 108234223 | A | | 6/2018 | |
| CN | 105915604 | B | | 8/2018 | |
| CN | 108388679 | A | | 8/2018 | |
| CN | 104283869 | B | | 9/2018 | |
| CN | 109617878 | A | | 4/2019 | |
| CN | 105991782 | B | | 5/2019 | |
| CN | 110213180 | A | | 9/2019 | |
| CN | 110445884 | A | | 11/2019 | |
| CN | 110602048 | A | | 12/2019 | |
| CN | 107534919 | B | | 1/2020 | |
| CN | 110673860 | A | | 1/2020 | |
| CN | 106936777 | B | | 2/2020 | |
| CN | 109254831 | B | | 5/2020 | |
| CN | 111147617 | A | | 5/2020 | |
| CN | 106878095 | B | | 6/2020 | |
| CN | 110445889 | B | | 6/2020 | |
| CN | 109819059 | B | | 7/2020 | |
| CN | 109561108 | B | | 9/2020 | |
| CN | 111641719 | A | | 9/2020 | |
| CN | 112153167 | A | | 12/2020 | |
| EP | 2260649 | B1 | | 6/2014 | |
| EP | 2922238 | A1 | | 9/2015 | |
| IN | 201847000611 | A | | 1/2018 | |
| IN | 314506 | B | | 6/2019 | |
| JP | 2004274174 | A | | 9/2004 | |
| JP | 2009500918 | A | | 1/2009 | |
| KR | 2004028398 | A | | 4/2004 | |
| KR | 2007120784 | A | | 12/2007 | |
| KR | 2015049251 | A | | 5/2015 | |
| KR | 2211187 | B1 | | 2/2021 | |
| MX | 2011007869 | A | | 9/2011 | |
| NZ | 542082 | A | | 8/2008 | |
| RU | 2595517 | C2 | | 8/2016 | |
| TR | 201620163 | A2 | | 7/2018 | |
| WO | 2003036899 | A2 | | 5/2003 | |
| WO | 2016064536 | A1 | | 4/2016 | |
| WO | 2017023256 | A1 | | 2/2017 | |
| WO | 2019084853 | A1 | | 5/2019 | |
| WO | WO-2020212998 | A1 | * | 10/2020 | H04L 61/5046 |

* cited by examiner

SYSTEMS AND METHODS FOR AUTOMATIC INTERNET PROTOCOL ADDRESS MANAGEMENT

CROSS-REFERENCE TO RELATED APPLICATIONS

This application is a continuation of Ser. No. 17/862,045, filed Jul. 11, 2022, entitled "SYSTEMS AND METHODS FOR AUTOMATIC INTERNET PROTOCOL ADDRESS MANAGEMENT," which is a continuation of U.S. patent application Ser. No. 17/315,113, filed May 7, 2021, entitled "SYSTEMS AND METHODS FOR AUTOMATIC INTERNET PROTOCOL ADDRESS MANAGEMENT," which issued as U.S. Pat. No. 11,456,987, on Sep. 27, 2022, the entire contents and disclosure of which are incorporated herein by reference in its entirety.

BACKGROUND OF THE DISCLOSURE

The field of the disclosure relates generally to automatic Internet Protocol (IP) address management, and more specifically, to automatically allocating CIDRs (Classless Inter-Domain Routing) in a deployed environment.

IPAM (IP Address Management) is a service that manages IP addresses, also known as Classless Inter-Domain Routing (CIDRs). Tracking and assigning an IP address is an important service to many companies. Properly knowing which IP addresses are assigned to which accounts and/or services is vital. Furthermore, knowing which IP addresses are available at any point in time allows a company to know when they need to purchase more IP address ranges. CIDRs are variable-length subnet blocks of IP addresses. The CIDRs must not overlap and must be large enough to contain all of the computing resources that will exist on the network. In many systems, CIDRs are tracked and assigned by users. However, human errors can happen in copying and pasting or in manually performing CIDR calculations. Common issues that are sometimes encountered include CIDRs of improper size and conflicts with accounts being assigned the same CIDR as multiple analysts work from the same document simultaneously. Furthermore, different users could have different methodologies for determining the next available set of IP addresses or CIDR. Accordingly, an automated system and methodology that accurately assigns IP addresses through the use of CIDRs is desired.

BRIEF DESCRIPTION OF THE DISCLOSURE

The present embodiments may relate to systems and methods for automatic IP address range allocation. The system may include an IP address management computing device, one or more client devices, one or more third party servers, and/or one or more databases.

In at least one embodiment, a system for automatic IP address range allocation is provided. The system may include one or more processors, one or more computer readable storage devices, and a plurality of program instructions stored on at least one of the one or more storage devices for execution by at least one of the one or more processors. When executed by the one or more processors, the plurality of program instructions cause the one or more processors to a) store an availability map of IP addresses including a pointer to a next available IP address range of a first size, b) receive, from a requestor computer device, a request for an IP address range of the first size, c) select the next available IP address range of the first size based on the pointer, d) move the pointer to another available IP address range of the first size, e) place the selected IP address range of the first size in a quarantine pool, and f) transmit, to the requestor computer device, the selected IP address range of the first size. The system may include additional, less, or alternate functionality, including that discussed elsewhere herein.

In another embodiment, a computer implemented method for automatic IP address range allocation is provided. The method may include a) storing, in one or more storage devices, an availability map of IP addresses including a pointer to a next available IP address range of a first size, b) receiving, from a requestor computer device, a request for an IP address range of the first size, c) selecting the next available IP address range of the first size based on the pointer, d) moving the pointer to another available IP address range of the first size, e) placing the selected IP address range of the first size in a quarantine pool, and f) transmitting, to the requestor computer device, the selected IP address range of the first size. The method may include additional, less, or alternate actions, including those discussed elsewhere herein.

In a further embodiment, a computer-readable storage medium having computer-executable instructions embodied thereon is provided. When executed by a computing device having at least one processor coupled to at least one memory device, the computer-executable instructions cause the processor to a) store an availability map of IP addresses including a pointer to a next available IP address range of a first size, b) receive, from a requestor computer device, a request for an IP address range of the first size, c) select the next available IP address range of the first size based on the pointer, d) move the pointer to another available IP address range of the first size, e) place the selected IP address range of the first size in a quarantine pool, and f) transmit, to the requestor computer device, the selected IP address range of the first size. The computer-executable instructions embodied on the computer-readable storage medium may include additional, less, or alternate functionality, including that discussed elsewhere herein.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings, arrangements which are presently discussed. However, it being understood that the present embodiments are not limited to the precise arrangements and/or instrumentalities shown.

Figure 1:
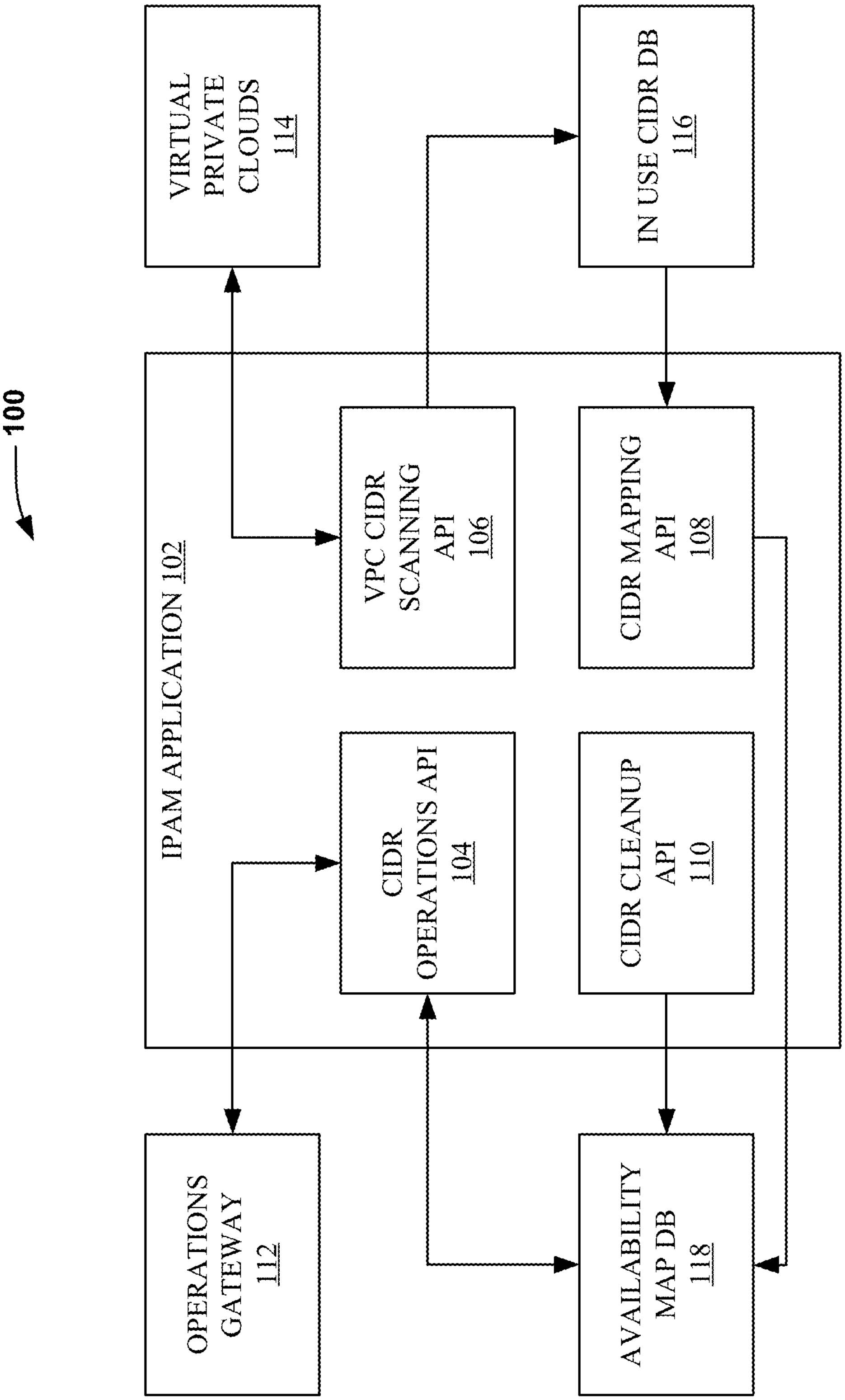
FIG. 1 illustrates a block diagram of an IP Address Management (IPAM) system for automatically allocating CIDRs of IP Addresses in accordance with at least one embodiment.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DISCLOSURE

The present embodiments may relate to, inter alia, systems and methods for automatically allocating CIDRs of IP addresses in a deployed environment. In an exemplary embodiment, the process is performed by an IP address management ("IPAM") application. In some other embodiments, the IPAM application may be executed by an IPAM computer device and/or IPAM server. The IPAM application manages a network's CIDR usage, such as on a Public Cloud platform. The IPAM application distributes CIDRs and tracks consumption while allowing for dynamic adjustments as needed. A CIDR refers to IP address blocks using the Classless Inter-Domain Routing (CIDR) format. While CIDRs are usable in a plurality of sizes, for the purposes of this discussion, CIDRs will have a default size of /24 or 256 IP addresses.

Depending on the size of the request, the IPAM application will combine or breakdown ranges of addresses for fulfillment. By utilizing standard services that come with public cloud platforms, this IPAM application can be modular and deployed anywhere the user desires in relation to the public cloud.

This IPAM application reduces human interactions and mistakes in a mostly automated environment. In the exemplary embodiment, the IPAM application may rely on serverless computing for the mathematic calculations and a database for durable persistent storage. Given the scale at which different companies' cloud footprints are growing, automating as many steps in the process may improve efficiency and consistency.

In some manual systems upon receiving a request, an analyst would use tools to retrieve a list of the CIDRs in use and compare that to the spreadsheet or other tracking document. Based on that retrieved list, the user would then identify a CIDR that could be used next, where different users could use different methodologies to determine the next CIDR. If the requesting CIDR is /24, then the user would assign a CIDR and update the spreadsheet. For requests larger or smaller than /24, a network analyst would then calculate and identify possible CIDRs to use and either update the code themselves or relay it back to the requesting analyst. Either party would then update the spreadsheet. The assigned CIDR would then be used as needed.

This known methodology is inefficient and requires updating to ensure efficiency and accuracy. For example, more than one analyst could assign the same CIDR, either by doing so at the same time and/or by mistakenly updating the spreadsheet. Furthermore, for global networks where a request may arrive at any time, there needs to be at least one analyst available 24 hours per day and 7 days per week. Accordingly, the disclosed methodology described herein describes a system and method for automatically allocating CIDRs of IP addresses in a deployed environment that include many improvements over the prior known approach.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

The five characteristics are: on-demand self-service, broad network access, resource pooling, rapid elasticity, and measured service. On-demand self-service refers to the capability for a cloud consumer to unilaterally provision computing capabilities, such as server time and network storage, as needed automatically without requiring human interaction with the service's provider.

Broad network access refers to capabilities being available over a network and accessed through standard mechanisms that promote use by heterogeneous thin or thick client platforms (e.g., mobile phones, laptops, and PDAs).

Resource pooling refers to the provider's computing resources being pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity includes that capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service includes where cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

The three service models include: software as a service (Saas), platform as a service (PaaS), and infrastructure as a service (IaaS).

Software as a Service (SaaS) includes where the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities with the possible exception of limited user-specific application configuration settings.

Platform as a Service (PaaS) includes where the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS) includes where the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

The four deployment models include: private cloud, community cloud, public cloud, and hybrid cloud.

Private cloud refers to a cloud infrastructure that is operated solely for an organization. It may be managed by the organization or a third party and may exist on-premises or off-premises.

A community cloud is a cloud infrastructure that is shared by several organizations and supports a specific community that has shared concerns (e.g., mission, security requirements, policy, and compliance considerations). It may be managed by the organizations or a third party and may exist on-premises or off-premises.

A public cloud is a cloud infrastructure that is made available to the general public or a large industry group and is owned by an organization selling cloud services.

In a hybrid cloud the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Turning now to an overview of technologies that are more specifically relevant to aspects of the disclosure, configuring network services for computing resources, an administrator typically is required to choose an IP address range using the Classless Inter-Domain Routing (CIDR) format to reserve a network. The IP address range that is chosen resides within one or more parent IP address ranges and must not overlap any previously reserved IP address ranges. The IP range must also be large enough to contain all of the computing resources that will exist on the network. However, even though an administrator who configures network services typically has the highest security authorization, the network services tools may not include error checking capability to prevent network misconfiguration. For the purposes of this discussion, the default CIDR is /24, which contains 256 IP addresses.

Consider a major cloud computing provider, having cloud regions world-wide, and each region having multiple sets of data centers. Each data center can include several thousand servers and other networked devices such as printers, routers, and networked storage devices. Each server can require several unique network connections, and therefore several IP addresses, for many purposes, a few of which include bandwidth, failover/recovery, and for the servers to communicate system control commands among them and with a command control point.

Incorrectly configuring a network IP address can result in a failure as simple as an end user's inability to connect to an application or printer. However, a misconfigured network can result in a more catastrophic system failure, such as a broadcast storm. This is a network condition in which messages broadcast on a network cause multiple hosts to respond by broadcasting their own messages, and so on. At a minimum, a broadcast storm results in performance degradation, but the performance can be so poor that the network ceases to function because of the excessive traffic.

Accordingly, the systems and methods described herein provide advantages including, but not limited to: a) improved accuracy in the allocation of IP address ranges; b) full-time automated support; c) reduced inefficiency in IP address allocation and management; d) faster allocation of IP address ranges; and e) reduced manpower required to maintain large computer networks.

Therefore, embodiments of the present disclosure tend to improve system reliability, availability, and serviceability by providing automatically allocating CIDRs of IP addresses in a deployed environment.

As described further below, the IPAM application maintains an availability map listing the currently available /24 CIDRs including a pointer to the next /24 CIDR available, a reserve pool of /24 CIDRs that have been divided into sections that are smaller than a /24, and a quarantine pool. When the IPAM application receives a request for a /24, then the next /24 CIDR available is removed from the availability map and the selected /24 CIDR is placed in the quarantine pool. If the request is larger than a /24 CIDR, the IPAM application scans the availability map for the next acceptable starting /24 CIDR with sequential /24 CIDRs to fulfill the request. The IPAM application ensures that the final CIDRs provided for the request are continuous. If the request is smaller than a /24 CIDR, the IPAM application scans the availability map to see if there are any appropriately sized sections of a /24 CIDR available. If there is an appropriately sized section, then that section is assigned. Otherwise, the IPAM application looks to split up a section of the next size up or greater. If there are no available sections of the larger sizes (up to /25), then the IPAM application retrieves the next available /24 CIDR from the availability map, divides the /24 CIDR to create a section of the appropriate size, and assigns the /24 CIDR to the reserve pool.

Exemplary IPAM System

FIG. 1 illustrates a block diagram of an IP address management (IPAM) system 100 for automatically allocating CIDRs of IP addresses in accordance with at least one embodiment. The system 100 includes one or more computer devices executing an IPAM application 102. In the exemplary embodiment, the IPAM application 102 is executed via Software as a Service (Saas), where the IPAM application 102 is executed on one or more computer devices managed in a virtual environment.

In the exemplary embodiment, the IPAM application 102 includes a plurality of application programming interfaces (API) that control different functions of the IPAM application 102. In other embodiments, other types of functions, procedures, and/or interfaces may be used to execute the processes described herein. In the exemplary embodiment, the APIs include a CIDR operations API 104, a virtual private cloud (VPC) scanning API 106, a CIDR mapping API 108, and a CIDR clean-up API 110.

In the exemplary embodiment, the IPAM system 100 includes a front-end and a back-end. The front-end handles requests for CIDRs and includes an operations gateway 112 and the CIDR operations API 104. The operations gateway 112 provides an interface between a system or systems requesting IP addresses and the IPAM system 100 that manages the allocation of those IP addresses. The operations gateway 112 receives the requests for IP addresses and returns the results of those requests to the requestor. In the exemplary embodiment, the requestor is a computer system or subsystem that needs the IP addresses for a virtual public cloud or other network allocation need. The CIDR operations API 104 evaluates the incoming IP address requests and performs the necessary steps to accommodate those requests.

For default or /24 CIDR requests, the CIDRP operations API 104 selects the next /24 CIDR from an availability map database 118. The availability map database 118 includes a listing of the available /24 CIDRs including a pointer to the next available /24 CIDR. The CIDR operations API 104 removes the selected /24 CIDR from the availability map in the availability map database 118 and registers the selected /24 CIDR in a quarantine pool 202 (shown in FIG. 2). In some environments, the quarantine pool 202 is configured to hold the CIDR for up to seven days or until the CIDR is found to be associated with a virtual public cloud (VPC). The availability map database 118 also tracks all of the available sections of CIDRs, where the sections are smaller than a /24 CIDR. The available sections may be listed in one or more sub CIDR pools. The sub CIDR pools may be sorted and list the available sections by size.

For larger requests, such as, but not limited to, CIDRs ranging from /23 to /20, the availability map database 118 is scanned for acceptable starting CIDRs and their sequential /24 CIDRs to fulfill the request. When a set of continuous /24 CIDRs are located, the first CIDR and the subsequent sequential CIDRs are placed in the quarantine pool 202. For smaller requests, with CIDRs ranging from /25 to /28, the availability map database 118 is checked for appropriately sized sections. When a CIDR section is selected to be used, it is removed from the availability map DB 118. If no appropriately sized section is located, then a larger section of CIDR will be broken down and used. For example, a /27 is requested but only a /25 is available. The CIDR operations API 104 breaks down the /25 into two /26s. The CIDR operations API 104 breaks one of the /26s into two /27s. The CIDR operations API 104 returns one /27 in response to the request. The remaining /26 and /27 remain on the availability map and are listed in the sub CIDR pool.

If there are no available sections of the larger sizes (up to /25), then the CIDR operations API 104 retrieves the next available /24 CIDR from the availability map DB 118, divides the /24 CIDR to create a section of the appropriate size. The section of the appropriate size is assigned to fulfill the request. The rest of the sections of the /24 CIDR may be listed in sub CIDR pools. The CIDR operations API 104 assigns the /24 CIDR to the reserve pool 302 (shown in FIG. 3). The reserve pool 302 contains the /24 CIDRs of CIDRs that have been divided into smaller sections. The reserve pool 302 prevents the contained /24 CIDRs from being added back into the availability pool unless all of their child sections have been released.

The back-end maintains the databases to ensure that the appropriate CIDRs are selected by the front-end. In the exemplary embodiment, the back-end includes access to the virtual private clouds 114, an in use CIDR database 116, the availability map database 118, the VPC CIDR scanning API 106, the CIDR mapping API 108, and the CIDR clean-up API 110.

In the exemplary embodiment, the VPC CIDR scanning API 106 may be trigger by one of two triggers. The first trigger would be a time-based trigger. For example, the first trigger would be executed every 10 minutes, every 30 minutes, every hour, or every period of time as set in one or more preferences. The second trigger would be based on the IPAM system 100 receiving a notification, such as from a simple notification service. The notification may be that a new account has been opened, or any other notification that would require the activation of the VPC CIDR scanning API 106. When triggered, the VPC CIDR scanning API 106 accesses all active accounts and gathers the CIDRs associated with the VPCs 114 and those accounts. The VPC CIDR scanning API 106 stores the listing of CIDRs that are being used by VPCs 114 in the In Use CIDR database 116.

In the exemplary embodiment, the CIDR mapping API 108 may be evoked by one of two triggers. The first trigger would be a time-based trigger. For example, the first trigger would be executed every 5 minutes, every 30 minutes, every hour, or every period of time as set in one or more preferences. The second trigger would be based on the VPC CIDR scanning API 106 finishing and then the IPAM application 102 may trigger the CIDR mapping API 108. The CIDR mapping API 108 scans and cleans the quarantine pool 202. First, the CIDR mapping API 108 removes any CIDRs in the quarantine pool 202 that are in use based on the In Use CIDR database 116, such as being associated with a VPC. Then the CIDR mapping API 108 removes any CIDRs that have expired. For example, a /24 CIDR was added to the quarantine pool 202 by the CIDR operations API 104. However, the /24 CIDR was not used or assigned to a VPC after a specific period of time (e.g., seven days) and is therefore removed from quarantine pool 202 and returned to the list or map of available CIDRs in the availability map database 118.

Next, the CIDR mapping API 108 uses the In Use CIDR database 116 and the quarantine pool 202 to determine all of the available CIDRs by mapping all possible available /24 CIDRs into the availability map to be stored on the availability map database 118. For CIDRs greater than /24, the CIDR mapping API 108 calculates the continuous /24 CIDRs and removes those CIDRs from the availability map. For CIDRs smaller than /24 (e.g., /25 to /28), the CIDR mapping API 108 places the parent /24 CIDR into the reserve pool 302. The CIDR mapping API 108 determines which smaller sections of the /24 CIDR are available and places them in the availability map database 118. In some embodiments, the CIDR clean-up API 110 is then triggered.

The CIDR clean-up API 110 regulates the data in the availability mapping database (DB) 118 to prevent misusage of CIDRs, such as CIDRs outside of the IPAM system 100. In the exemplary embodiment, the CIDR clean-up API 110 performs multiple clean-up steps. First, the CIDR clean-up API 110 validates the CIDR sections in the availability map database 118 (the sections of CIDRs smaller than /24). For example, the IPAM system 100 uses a /28 CIDR, where a /27 CIDR is in the availability map database 118. The IPAM system 100 removes the /27 CIDR from the sub CIDR pool and divides the /27 CIDR into two /28 CIDRs, where one /28 CIDR is put in use and the other /28 CIDR is placed in the sub CIDR pool. The CIDR clean-up API 110 analyzes the availability map database 118 to see if any CIDRs are in the quarantine pool 202. The CIDR clean-up API 110 scans the availability map database 118 and the quarantine pool 202 for any inconsistencies. For example, the same CIDR section may be in the quarantine pool 202 and the availability map database 118. The CIDR clean-up API 110 also determines if any CIDR sections in the availability map database 118 may be combined. For example, if there are two continuous /28 sections, the CIDR clean-up API 110 combines the two /28 sections to build a /27 section. While there may be more than one CIDR section of the same size in the availability map database 118, the CIDR clean-up API 110 will only combine those that are continuous. If all of the sections of a /24 CIDR are combined, then the /24 CIDR is released from the reserve pool 302. In one example, this may occur when one or more sections in the quarantine pool 202 are released as unused. Then those sections may be recombined with the other sections of the /24 CIDR and the /24 CIDR is released from the reserve pool 302.

Exemplary Allocation Process

Figure 2:
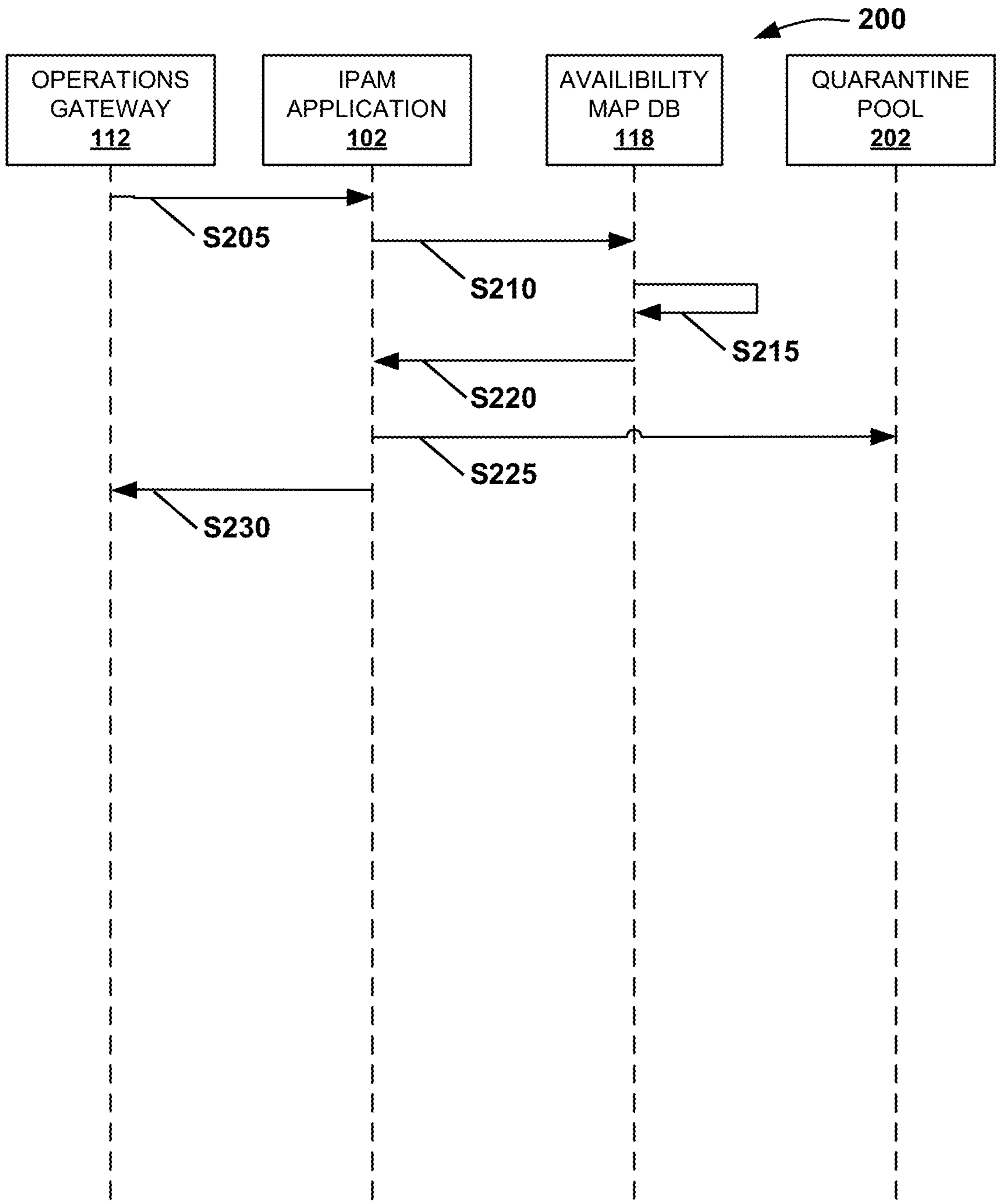
FIG. 2 illustrates a timing diagram of a process of allocating a CIDR using the IPAM system shown in FIG. 1.

FIG. 2 illustrates a timing diagram of a process 200 of allocating a CIDR using the IPAM system 100 (shown in FIG. 1). In the exemplary embodiment, process 200 is configured for allocating /24 CIDRs and CIDRs of larger sizes, such as, but not limited to, /23 CIDR-/20 CIDR.

In the exemplary embodiment, the operations gateway 112 receives a request for a CIDR. The CIDR is for size /24 or greater, where the greater size consists of a plurality of /24 CIDRs.

In step S205, the operations gateway 112 transmits the request to the IPAM application 102. The IPAM application 102 determines if the request is for a single /24 CIDR or for multiple /24 CIDRs. In some embodiments, the request may be a default for blank request. For the purposes of this discussion a default request is for a single /24 CIDR. For a single /24 CIDR request, in step S210, the IPAM application 102 requests the next available /24 CIDR from the availability map database 118. In step S215, the availability map database 118 determines and selects the next available /24 CIDR. In the exemplary embodiment, the availability map database 118 stores a pointer to the next available /24 CIDR. The availability map database 118 updates its pointer to another available /24 CIDR. In step S220, the availability map database 118 transmits the selected /24 CIDR to the IPAM application 102. In step S225, the IPAM application 102 transmits the selected /24 CIDR to the quarantine pool 202. The quarantine pool 202 is configured to store the /24 CIDR for up to seven days or until the /24 CIDR is determined to be in use. In step S230, the IPAM application 102 transmits the selected /24 CIDR to the operations gateway 112 to be transmitted back to the requesting system.

If the request is for multiple /24 CIDRs, in step S215, the availability map database 118 determines the next continuous set of /24 CIDRs that fulfill the request. In some situations, the pointer to the next /24 CIDR will not fulfill the request because the request is for a continuous set of /24 CIDRs. In these situations, the availability map database 118 scans its listing of available /24 CIDRs to determine where the next continuous set of /24 CIDRs is located to fulfill the request. In step S220, the availability map database 118 transmits at least the first /24 CIDR for the request. In some embodiments, the availability map database 118 transmits the first and the last /24 CIDRs for the request. In still other embodiments, the availability map database 118 transmits a listing of all of the /24 CIDRs to fulfill the request. In step S225, the IPAM application 102 transmits the list of /24 CIDRs to make up the request to the quarantine pool 202. In step S230, the IPAM application 102 transmits the selected /24 CIDRs to the operations gateway 112 to be transmitted back to the requesting system.

Additional Exemplary Allocation Process

Figure 3:
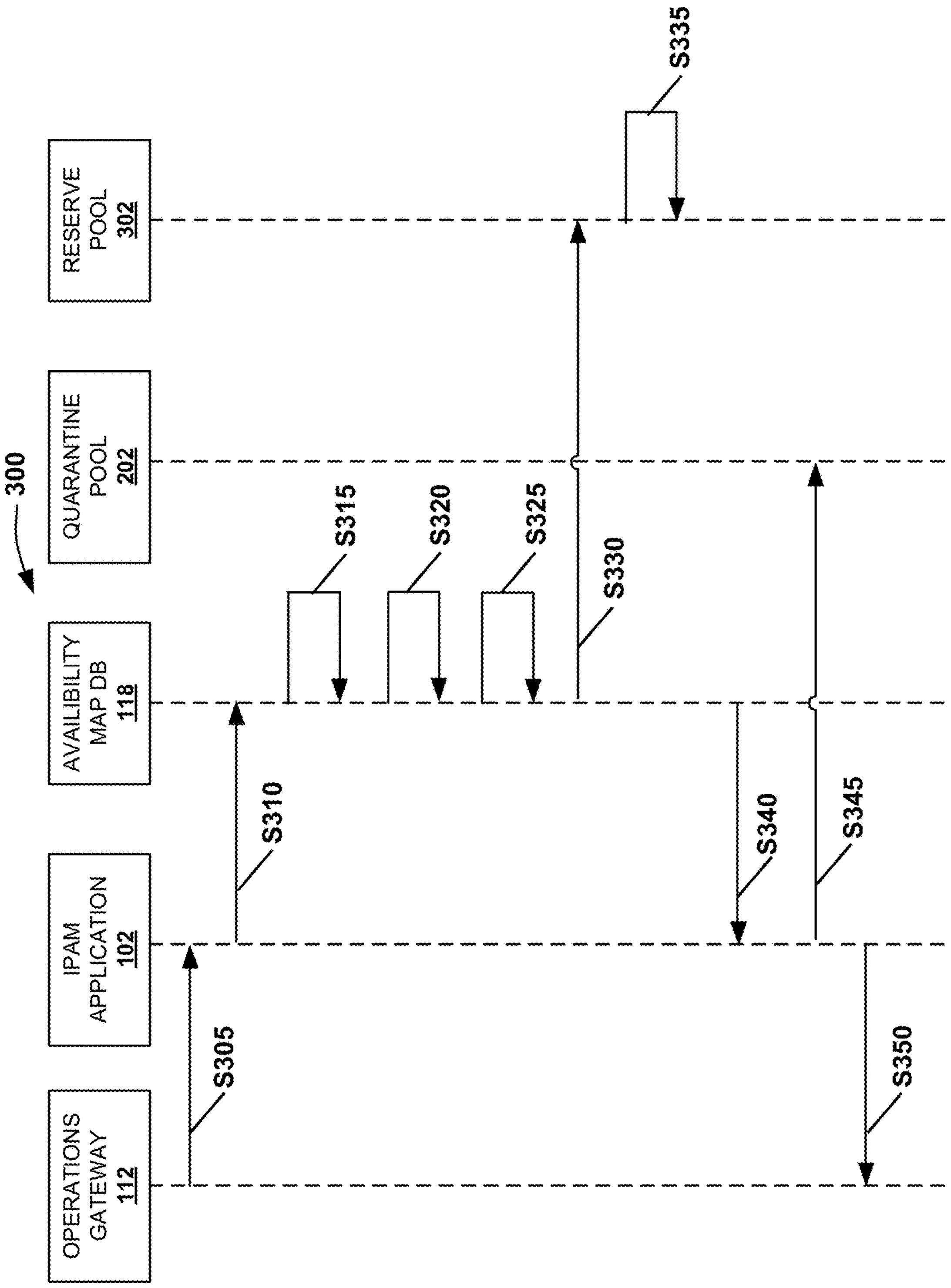
FIG. 3 illustrates a timing diagram of a process of allocating a CIDR smaller than /24 using the IPAM system shown in FIG. 1.

FIG. 3 illustrates a timing diagram of a process 300 of allocating a CIDR smaller than /24 using the IPAM system 100 (shown in FIG. 1). In the exemplary embodiment, process 300 is configured for allocating CIDRs of sizes smaller than /24 CIDR, such as, but not limited to, /25 CIDR-/30 CIDR.

In the exemplary embodiment, the operations gateway 112 receives a request for a CIDR. The CIDR is for a size less than a /24 CIDR.

In step S305, the operations gateway 112 transmits the request to the IPAM application 102. The IPAM application 102 determines that the request is for a single CIDR that is smaller than a /24 CIDR. In step S310, the IPAM application 102 transmits the request to the availability map DB 118 to see if an appropriately sized section of a CIDR is available. In some embodiments, the availability map DB 118 tracks the available sections of CIDRs, such as in sub CIDR pools. The sub CIDR pools list the available CIDR sections based on size. In step S315, the availability map DB 118 determines if there is an available CIDR section of the appropriate size. For example, if the request is for a /28, the availability map DB 118 first checks to see if there is an available /28. If there is, then that /28 is selected and removed from the availability map DB 118. If there is not an available /28, then the availability map DB 118 checks the next larger size to see if there is a /27 available. If there is a /27 available, then the availability map DB 118 divides the /27 into two /28s and selects one of the /28s for the request and stores the other /28. If there is not an available /28, then the availability map DB 118 continues checking for larger CIDR sections. If there is no CIDR section available of the correct size, then the IPAM application 102 proceeds to steps S320 through S335. If the availability map DB 118 located a CIDR section of the correct size, process 300 proceeds to step S340, where the availability map DB 118 transmits the CIDR section of the appropriate size to the IPAM application 102. The IPAM application 102 proceeds to step S345 and transmits the provided CIDR section to the quarantine pool 202. Then in step S350, the IPAM application 102 transmits the selected CIDR section to the operations gateway 112 to be transmitted back to the requesting system.

If the availability map DB 118 is unable to provide a CIDR section of the appropriate size, the availability map DB 118 proceeds to step S320 and retrieves the next available /24 CIDR from the availability map database 118. In the exemplary embodiment, the availability map database 118 stores a pointer to the next available /24 CIDR. The availability map database 118 updates its pointer to another available /24 CIDR. In step S325, the availability map database 118 divides the /24 CIDR to get a CIDR section of the appropriate size. The availability map database 118 stores the remaining sections of the CIDR. In step S330, the availability map database 118 transmits the selected /24 CIDR to the reserve pool 302. In step S335, the reserve pool 302 stores the /24 CIDR as one of the CIDRs that have been divided into sections.

In step S340, the availability map DB 118 transmits the CIDR section of the appropriate size to the IPAM application 102. In step S345, the IPAM application 102 transmits the provided CIDR section to the quarantine pool 202. Then in step S350, the IPAM application 102 transmits the selected CIDR section to the operations gateway 112 to be transmitted back to the requesting system.

While the above discusses transmitting and receiving CIDRs, CIDRs represent a continuous block of consecutive IP address. Accordingly, in some embodiments, the IPAM system 100 described herein may transmit only the first IP address of the CIDR and potentially the length of the CIDR. In other embodiments, the IPAM system 100 may transmit the IP addresses of the first and last IP addresses in the CIDR block. In still further embodiments, the IPAM system 100 may transmit all of the IP addresses in the CIDR block. In still additional embodiments, the IPAM system 100 may transmit a pointer or other indicator to the beginning and/or end of the desired CIDR block. Accordingly, the different methodologies may be used with the systems and processes as described herein.

While the above discusses the reserve pool 302 as only storing the /24 CIDRs which have been divided up into sections. In some embodiments, the reserve pool 302 may also manage the sub CIDR pools to keep track of which CIDR sections are available.

Exemplary Back-End Management Process

Figure 4:
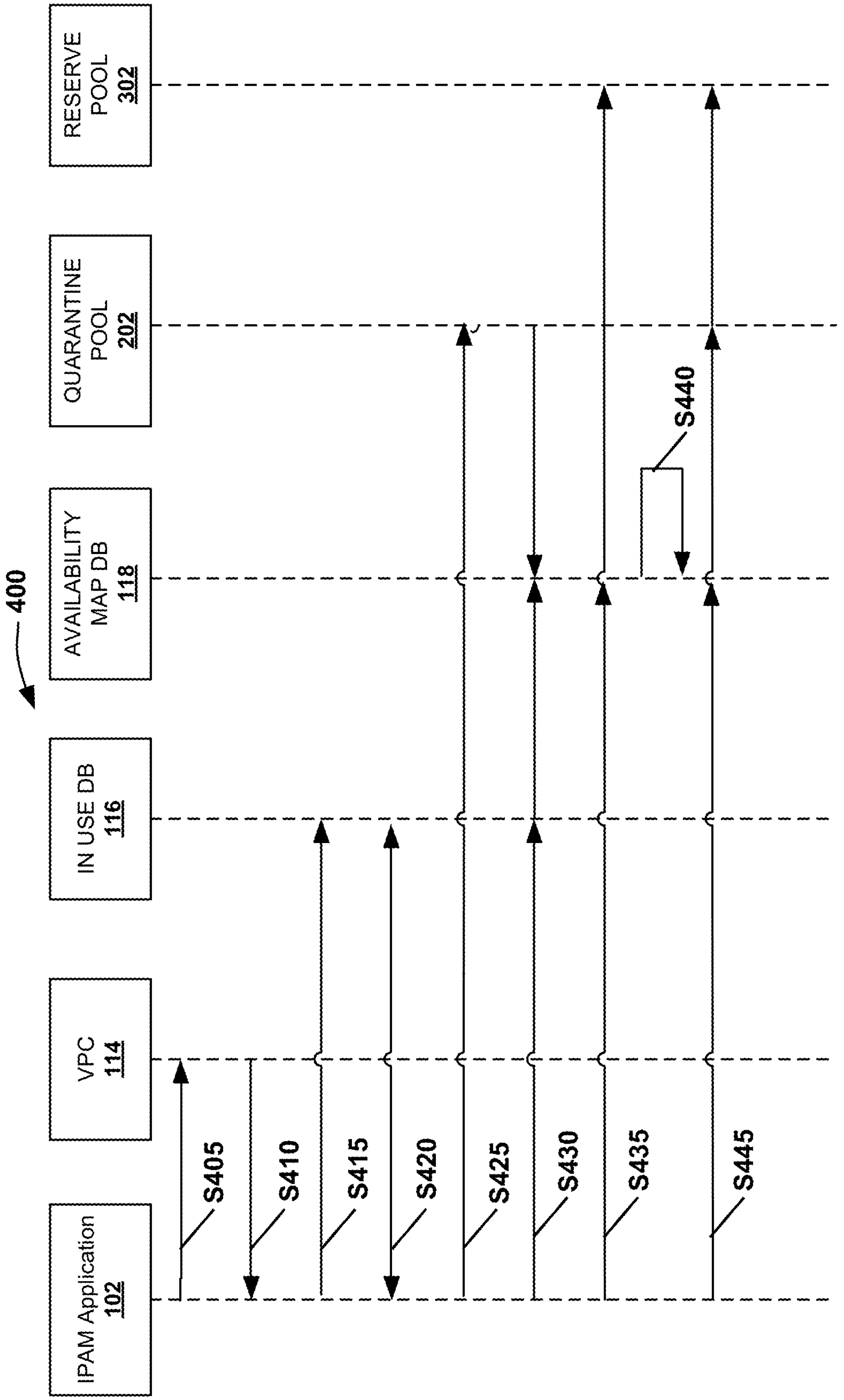
FIG. 4 illustrates a timing diagram of a process for maintaining lists of available CIDRs using the IPAM system shown in FIG. 1.

FIG. 4 illustrates a timing diagram of a process 400 for maintaining lists of available CIDRs using the IPAM system 100 (shown in FIG. 1).

Process 400 acts as the back-end of the IPAM system 100 to end maintain the databases to ensure that the appropriate CIDRs are selected by the front-end. In the exemplary embodiment, the process 400 is managed by the IPAM application 102. In some embodiments, the IPAM application 102 uses multiple APIs, such as, but not limited to, the VPC CIDR scanning API 106, the CIDR mapping API 108, and the CIDR clean-up API 110 (all shown in FIG. 1).

In the exemplary embodiment, in step S405, the IPAM application 102 triggers the VPC CIDR scanning API 106 to access all active accounts and gathers the CIDRs associated with the VPCs 114 and those accounts. In step S410 the VPCs 114 return the listing of the CIDRs that are currently in use by the VPCs 114. In the exemplary embodiment, the IPAM application 102 may be triggered to begin process 400 by one of two triggers. The first trigger would be a time-based trigger. For example, the first trigger would be executed every 10 minutes, every 30 minutes, every hour, or every period of time as set in one or more preferences. The second trigger would be the IPAM application 102 receiving a notification, such as from a simple notification service. The notification may be that a new account has been opened, or any other notification that would require the IPAM application to activate the VPC CIDR scanning API 106. In step S415, the IPAM application 102 transmits the listing of CIDRs that are being used by VPCs 114 to the In Use CIDR database 116 for storage.

The IPAM application 102 triggers the CIDR mapping API 108. In the exemplary embodiment, the CIDR mapping API 108 may be evoked by one of two triggers. The first trigger would be a time-based trigger. For example, the first trigger would be executed every 5 minutes, every 30 minutes, every hour, or every period of time as set in one or more preferences. The second trigger would be based on the VPC CIDR scanning API 106 finishing and then the IPAM application 102 may trigger the CIDR mapping API 108. In step S420, the CIDR mapping API 108 retrieves the list of CIDRs that are being used from the In Use CIDR database 116.

In step S425, the CIDR mapping API 108 scans and cleans the quarantine pool 202. First, the CIDR mapping API 108 removes any CIDRs in the quarantine pool 202 that are in use based on the In Use CIDR database 116, such as being associated with a VPC. Then the CIDR mapping API 108 removes any CIDRs that have expired. For example, a /24 CIDR was added to the quarantine pool 202 by the CIDR operations API 104. However, the /24 CIDR was not used or assigned to a VPC after a specific period of time (e.g., seven days) and is therefore removed from quarantine pool 202.

In step S430, the CIDR mapping API 108 uses the In Use CIDR database 116, the quarantine pool 202, and the reserve pool 302 to determine all of the available CIDRs by mapping all possible available /24 CIDRs into the availability map to be stored on the availability map database 118. For CIDRs greater than /24, the CIDR mapping API 108 calculates the continuous /24 CIDRS and removes those CIDRs from the availability map. For CIDRs smaller than /24 (e.g., /25 to /28), the CIDR mapping API 108 lists the available sections and places the parent /24 CIDR into the reserve pool 302. The CIDR mapping API 108 determines which smaller sections of the /24 CIDR are available and lists them in the availability map database 118. In some embodiments, the CIDR clean-up API 110 is then triggered.

In step S435, the IPAM application 102 triggers the CIDR clean-up API 110, which regulates the data in the availability mapping DB 118 to prevent misusage of CIDRs, such as CIDRs outside of the IPAM system 100. In the exemplary embodiment, the CIDR clean-up API 110 performs multiple clean-up steps. In step S435, the CIDR clean-up API 110 accesses the reserve pool 302. In step S440, the CIDR clean-up API 110 validates the /24 CIDRs in the reserve pool 302, where the /24 CIDRs in the reserve pool 302 include /24 CIDRs where sections of CIDRs smaller than /24 are either in use or in the quarantine pool 202. For example, the IPAM system 100 uses a /28 CIDR, where a /27 CIDR is available in the availability mapping DB 118. The IPAM system 100 removes the /27 CIDR and divides the /27 CIDR into two /28 CIDRs, where one /28 CIDR is put in use and the other /28 CIDR is placed in the availability map database 118. The CIDR clean-up API 110 analyzes the availability map database 118 to see if any CIDR sections are in the quarantine pool 202. In step S445, the CIDR clean-up API 110 scans the availability map database 118, the reserve pool 302, and the quarantine pool 202 for any inconsistencies. For example, the same CIDR section may be in both pools 202 and 302. The CIDR clean-up API 110 also determines if any CIDR sections in the availability map database 118 may be combined. For example, if there are two continuous /28 sections, the CIDR clean-up API 110 combines the two /28 sections to build a /27 section that is stored in the availability map database 118. If all sections of a /24 CIDR have been released, the entire /24 may be recombined and the complete /24 CIDR is removed from the reserve pool 302 and returned to the availability map database 118.

Figure 5:
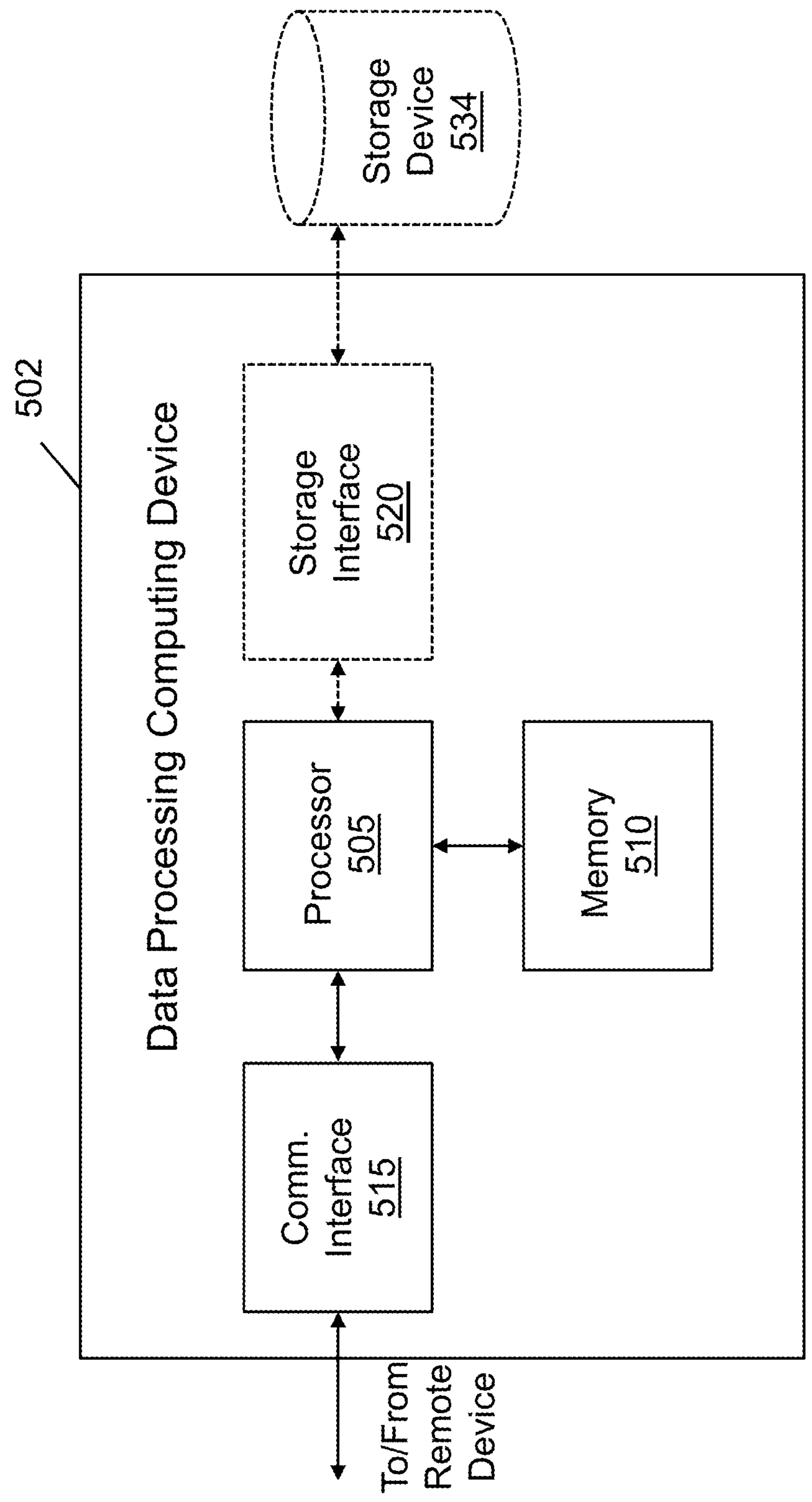
FIG. 5 illustrates a block diagram of an embodiment of a computer system or cloud server in which the present invention may be implemented.

FIG. 5 illustrates a block diagram of an embodiment of a computer system or cloud server in which the present invention may be implemented.

It should be appreciated that FIG. 5 provides only an illustration of one implementation and does not imply any limitations with regards to the environments in which different embodiments may be implemented. Many modifications to the depicted environments may be made based on design and implementation requirements.

Exemplary data processing system 500 is representative of any electronic device capable of executing machine-readable program instructions. Data processing system 500 may be representative of a smart phone, a computer system, PDA, or other electronic devices. Examples of computing systems, environments, and/or configurations that may represented by data processing system 500 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

Accordingly, data processing system 500 may include a processor 505 for executing instructions. Instructions may be stored in a memory area 510. Processor 505 may include one or more processing units (e.g., in a multi-core configuration).

Processor 505 may be operatively coupled to a communication interface 515 such that data processing system 500 is capable of communicating with a remote computing device. For example, data processing system 500 may receive requests from outside systems, such as through the operations gateway 112 (shown in FIG. 1) via the Internet and/or over a computer network.

Processor 505 may also be operatively coupled to a storage device 525 (e.g., In Use CIDR database 116 and availability map database 118, both shown in FIG. 1). Storage device 525 may be any computer-operated hardware suitable for storing and/or retrieving data. In some embodiments, storage device 525 may be integrated in data processing system 500. For example, data processing system 500 may include one or more hard disk drives as storage device 525. In other embodiments, storage device 525 may be external to data processing system 500 and may be accessed by a plurality of data processing systems 500. For example, storage device 525 may include a storage area network (SAN), a network attached storage (NAS) system, and/or multiple storage units such as hard disks and/or solid-state disks in a redundant array of inexpensive disks (RAID) configuration.

In some embodiments, processor 505 may be operatively coupled to storage device 525 via a storage interface 520. Storage interface 520 may be any component capable of providing processor 505 with access to storage device 525. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 525.

Exemplary Computer-Implemented Method

Figure 6:
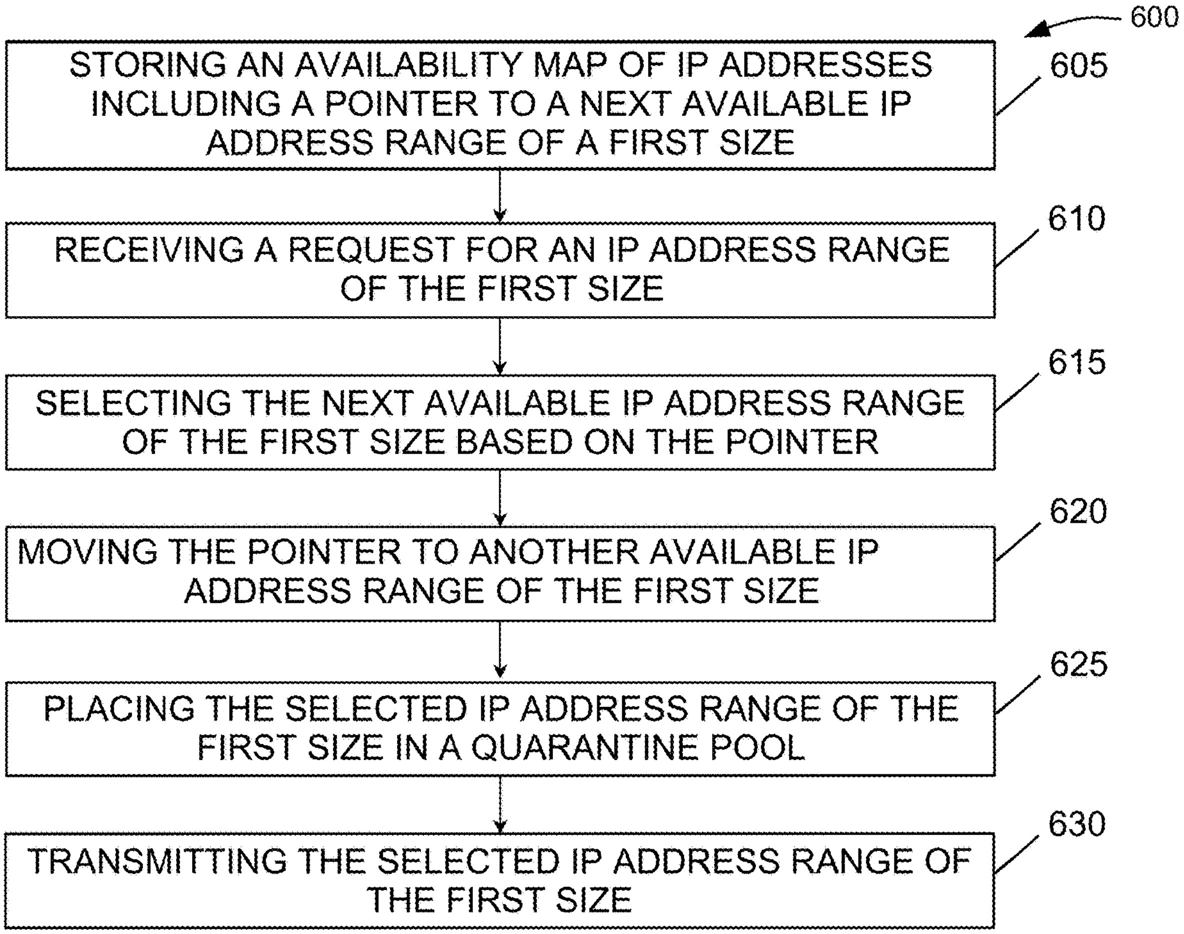
FIG. 6 illustrates a flow chart of an exemplary computer-implemented method implemented by the IPAM system shown in FIG. 1.

FIG. 6 illustrates a flow chart of an exemplary computer-implemented method 600 implemented by the IPAM system 100 (shown in FIG. 1). In the exemplary embodiment, method 600 may be implemented by an IPAM application 102 (shown in FIG. 1) executing on an IPAM system 100.

Method 600 may include storing 605, in one or more storage devices 534 (shown in FIG. 5), an availability map of IP addresses including a pointer to a next available IP address range of a first size. The first size of an IP address range may be a /24 CIDR.

The method 600 may also include receiving 610, from a requestor computer device, such as data processing computing device 502 (shown in FIG. 5), a request for an IP address range of the first size. The method may further include selecting 615 the next available IP address range of the first size based on the pointer. In addition, the method may include moving 620 the pointer to another available IP address range of the first size. Moreover, the method may include placing 625 the selected IP address range of the first size in a quarantine pool 202 (shown in FIG. 2). Furthermore, the method may include transmitting 630, to the requestor computer device, the selected IP address range of the first size.

In some embodiments, the method may include receiving, from the requestor computer device, a second request for an IP address range of a second size. Where the second size includes a plurality of IP address ranges of the first size, such as a request for a /23 CIDR. The method also includes scanning the availability map of IP addresses to detect the IP address range of the second size. The IP address range of the second size is a continuous set of a plurality of IP address ranges of the first size. The method may further include selecting the detected IP address range of the second size. In addition, the method may include placing the plurality of IP address ranges of the first size in the selected IP address range of the second size in the quarantine pool 202. Moreover, the method may include transmitting, to the requestor computer device, the selected IP address range of the second size. Furthermore, the method may include moving the pointer to another available IP address range of the first size if the plurality of IP address ranges of the first size includes the next available IP address range of the first size.

In additional embodiments, the availability map database 118 includes one or more unused sections of at least one IP address range of the first size. The method may include storing a reserve pool 302 (shown in FIG. 3) including the at least one IP address range of the first size, the method may additionally include receiving, from the requestor computer device, a third request for an IP address range of a third size. The first size includes a plurality of IP address ranges of the third size. The method may also include scanning the availability map database 118 to detect whether one of the one or more unused sections matches the IP address range of the third size. The method may further include selecting the detected unused section that matches the IP address range of the third size. In addition, the method includes placing the selected section of the third size in the quarantine pool 202. Moreover, the method may include transmitting, to the requestor computer device, the selected section of the third size. In addition, the method may also include determining that the availability map database 118 does not include an unused section of the third size. And the method may include determining whether the availability map database 118 includes an unused section of a fourth size. The IP address range of the fourth size includes a plurality of IP address ranges of the third size.

In some further embodiments, the method may include determining that the availability map database 118 includes an unused section of the fourth size. The method may also include dividing the unused section of the fourth size into a plurality of sections including a selected section of the third size. The method may further include storing the remaining sections of the plurality of sections in the availability map database 118. In addition, the method may include placing the selected section of the third size into the quarantine pool 202. Moreover, the method may include transmitting, to the requestor computer device, the selected section of the third size.

In still further embodiments, the method may include determining that the availability map database 118 does not include an unused section of the fourth size. The method may also include selecting the next available IP address range of the first size based on the pointer. The method may further include moving the pointer to another available IP address range of the first size. In addition, the method may include dividing the selected IP address range of the first size into a plurality of sections including a selected section of the third size. Moreover, the method may include storing the remaining sections of the plurality of sections in the availability map database 118. Additionally, the method may include storing the selected IP address range of the first size to the reserve pool. Furthermore, the method may include placing the selected section of the third size in the quarantine pool 202. In addition, the method may also include transmitting, to the requestor computer device, the selected section of the third size.

In yet further embodiments, the method may include determining a listing of IP address ranges that are currently in use. The method may also include updating the availability map of IP addresses based on the listing of IP address ranges. The method may further include comparing the listing of IP address ranges to the quarantine pool 202 to detect any matches. In addition, the method may include removing any IP address ranges from the quarantine pool 202 based on the matches. Moreover, each IP address range in the quarantine pool 202 includes an expiration time and the method may include scanning the quarantine pool 202 to see if any IP address ranges have exceeded their expiration time. Furthermore, the method may include removing those IP address ranges from the quarantine pool 202 that exceeded their expiration time.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as image, mobile device, vehicle telematics, autonomous vehicle, and/or intelligent home telematics data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing-either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs.

Additional Considerations

Described herein are computer systems such as the IP address management computer devices and related computer systems. As described herein, all such computer systems include a processor and a memory. However, any processor in a computer device referred to herein can also refer to one or more processors wherein the processor can be in one computing device or a plurality of computing devices acting in parallel. Additionally, any memory in a computer device referred to herein can also refer to one or more memories wherein the memories can be in one computing device or a plurality of computing devices acting in parallel.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps," or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor can include any programmable system including systems using micro-controllers, reduced instruction set circuits (RISC), application-specific integrated circuits (ASICs), logic circuits, and any other circuit or processor capable of executing the functions described herein. The above examples are example only, and are thus not intended to limit in any way the definition and/or meaning of the term "processor."

As used herein, the term "database" can refer to either a body of data, a relational database management system (RDBMS), or to both. As used herein, a database can include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database can be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another example, a computer program is provided, and the program is embodied on a computer-readable medium. In an example, the system is executed on a single computer system, without requiring a connection to a server computer. In a further example, the system is being run in a Windows® environment (Windows is a registered trademark of Microsoft Corporation, Redmond, Washington). In yet another example, the system is run on a mainframe environment and a UNIX® server environment (UNIX is a registered trademark of X/Open Company Limited located in Reading, Berkshire, United Kingdom). In a further example, the system is run on an iOS® environment (iOS is a registered trademark of Cisco Systems, Inc. located in San Jose, CA). In yet a further example, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some examples, the system includes multiple components distributed among a plurality of computer devices. One or more components can be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present examples can enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example" or "one example" of the present disclosure are not intended to be interpreted as excluding the existence of additional embodiments that also incorporate the recited features.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the examples described herein, these activities and events occur substantially instantaneously.

The systems and processes are not limited to the specific examples described herein. In addition, components of each system and each process can be practiced independent and separate from other components and processes described herein. Each component and process also can be used in combination with other assembly packages and processes.

The patent claims at the end of this document are not intended to be construed under 35 U.S.C. § 112(f) unless traditional means-plus-function language is expressly recited, such as "means for" or "step for" language being expressly recited in the claim(s).

The computer-implemented methods discussed herein can include additional, less, or alternate actions, including those discussed elsewhere herein. The methods can be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium. Additionally, the computer systems discussed herein can include additional, less, or alternate functionality, including that discussed elsewhere herein. The computer systems discussed herein may include or be implemented via computer-executable instructions stored on non-transitory computer-readable media or medium.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein can be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for automatic IP address range allocation comprising:

one or more processors, one or more computer readable storage devices, and a plurality of program instructions stored on at least one of the one or more storage devices for execution by at least one of the one or more processors, when executed by the one or more processors, the plurality of program instructions cause the one or more processors to:

store an availability map of IP addresses including a pointer to a next available IP address range of a first size;

receive, from a requestor computer device, a request for an IP address range of the first size;

select the next available IP address range of the first size based on the pointer;

move the pointer to another available IP address range of the first size;

place the selected IP address range of the first size in a quarantine pool which includes a listing of IP addresses that are currently unavailable;

transmit, to the requestor computer device, the selected IP address range of the first size;

scan the quarantine pool to see if any IP address ranges have exceeded their expiration time; and remove those IP address ranges from the quarantine pool that exceeded their expiration time.

2. The system of claim 1, wherein the plurality of program instructions cause the one or more processors to:

determine that the availability map of IP addresses does not include an unused section of a second size, wherein the first size includes a plurality of IP address ranges of the second size; and determine whether the availability map of IP addresses includes an unused section of a third size, wherein the IP address range of the third size includes a plurality of IP address ranges of the second size.

3. The system of claim 2, wherein the plurality of program instructions cause the one or more processors to:

determine that the availability map of IP addresses includes an unused section of the third size;

divide the unused section of the third size into a plurality of sections including a selected section of the second size;

store the remaining sections of the plurality of sections in the availability map of IP addresses; and transmit, to the requestor computer device, the selected section of the second size.

4. The system of claim 2, wherein the plurality of program instructions cause the one or more processors to:

determine that the availability map of IP addresses does not include an unused section of the third size;

select the next available IP address range of the first size based on the pointer;

move the pointer to another available IP address range of the first size;

divide the selected IP address range of the first size into a plurality of sections including a selected section of the second size;

store the remaining sections of the plurality of sections in the availability map of IP addresses; and transmit, to the requestor computer device, the selected section of the second size.

5. The system of claim 2, wherein the plurality of program instructions cause the one or more processors to:

determine that the availability map of IP addresses does not include an unused section of the third size;

select the next available IP address range of the first size based on the pointer;

move the pointer to another available IP address range of the first size;

divide the selected IP address range of the first size into a plurality of sections including a selected section of the second size;

store the remaining sections of the plurality of sections in a reserve pool of IP addresses, wherein the reserve pool prevents IP addresses of the remaining sections from being indicated as available unless all remaining sections have been released; and transmit, to the requestor computer device, the selected section of the second size.

6. The system of claim 1, wherein the plurality of program instructions cause the one or more processors to:

receive, from the requestor computer device, a request for an IP address range of a fourth size, wherein the fourth size includes a plurality of IP address ranges of the first size;

scan the availability map of IP addresses to detect the IP address range of the fourth size, wherein the IP address range of the fourth size is a continuous set of a plurality of IP address ranges of the first size;

select the detected IP address range of the fourth size; and transmit, to the requestor computer device, the selected IP address range of the fourth size.

7. The system of claim 1, wherein the first size is a continuous set of 256 IP addresses.

8. The system of claim 1, wherein the plurality of program instructions cause the one or more processors to:

determine a listing of IP address ranges that are currently in use; and update the availability map of IP addresses based on the listing of IP address ranges.

9. The system of claim 8, wherein the plurality of program instructions cause the one or more processors to:

compare the listing of IP address ranges to the quarantine pool to detect any matches; and remove any IP address ranges from the quarantine pool based on the matches.

10. A computer implemented method for automatic IP address range allocation implemented using at least one processor, the method comprising:

storing, in one or more storage devices, an availability map of IP addresses including a pointer to a next available IP address range of a first size;

receiving, from a requestor computer device, a request for an IP address range of the first size;

selecting the next available IP address range of the first size based on the pointer;

moving the pointer to another available IP address range of the first size;

placing the selected IP address range of the first size in a quarantine pool which includes a listing of IP addresses that are currently unavailable;

transmitting, to the requestor computer device, the selected IP address range of the first size;

scanning the quarantine pool to see if any IP address ranges have exceeded their expiration time; and removing those IP address ranges from the quarantine pool that exceeded their expiration time.

11. The method of claim 10 further comprising:

determining that the availability map of IP addresses does not include an unused section of a second size, wherein the first size includes a plurality of IP address ranges of the second size; and determining whether the availability map of IP addresses includes an unused section of a third size, wherein the IP address range of the third size includes a plurality of IP address ranges of the second size.

12. The method of claim 11 further comprising:

determining that the availability map of IP addresses includes an unused section of the third size;

dividing the unused section of the third size into a plurality of sections including a selected section of the second size;

storing the remaining sections of the plurality of sections in the availability map of IP addresses; and transmitting, to the requestor computer device, the selected section of the second size.

13. The method of claim 11 further comprising:

determining that the availability map of IP addresses does not include an unused section of the third size;

selecting the next available IP address range of the first size based on the pointer;

moving the pointer to another available IP address range of the first size;

dividing the selected IP address range of the first size into a plurality of sections including a selected section of the second size;

storing the remaining sections of the plurality of sections in the availability map of IP addresses; and transmitting, to the requestor computer device, the selected section of the second size.

14. The method of claim 13 further comprising:

determining a listing of IP address ranges that are currently in use; and updating the availability map of IP addresses based on the listing of IP address ranges.

15. The method of claim 14 further comprising:

comparing the listing of IP address ranges to the quarantine pool to detect any matches; and removing any IP address ranges from the quarantine pool based on the matches.

16. The method of claim 11 further comprising:

determining that the availability map of IP addresses does not include an unused section of the third size;

selecting the next available IP address range of the first size based on the pointer;

moving the pointer to another available IP address range of the first size;

dividing the selected IP address range of the first size into a plurality of sections including a selected section of the second size;

storing the remaining sections of the plurality of sections in a reserve pool of IP addresses, wherein the reserve pool prevents IP addresses of the remaining sections from being indicated as available unless all remaining sections have been released; and transmitting, to the requestor computer device, the selected section of the second size.

17. The method of claim 10 further comprising:

receiving, from the requestor computer device, a request for an IP address range of a fourth size, wherein the fourth size includes a plurality of IP address ranges of the first size;

scanning the availability map of IP addresses to detect the IP address range of the fourth size, wherein the IP address range of the fourth size is a continuous set of a plurality of IP address ranges of the first size;

selecting the detected IP address range of the fourth size; and transmitting, to the requestor computer device, the selected IP address range of the fourth size.

18. The method of claim 10, wherein the first size is a continuous set of 256 IP addresses.

19. A system for automatic IP address range allocation comprising:

one or more processors, one or more computer readable storage devices, and a plurality of program instructions stored on at least one of the one or more storage devices for execution by at least one of the one or more processors, when executed by the one or more processors, the plurality of program instructions cause the one or more processors to:

store an availability map of IP addresses including a pointer to a next available IP address range of a first size;

receive, from a requestor computer device, a request for an IP address range of the first size;

select the next available IP address range of the first size based on the pointer;

move the pointer to another available IP address range of the first size if the selected IP address range of the first size includes the next available IP address range of the first size;

place the selected IP address range of the first size in a quarantine pool which includes a listing of IP addresses that are currently unavailable;

transmit, to the requestor computer device, the selected IP address range of the first size;

determine a listing of IP address ranges that are currently in use;

update the availability map of IP addresses based on the listing of IP address ranges;

compare the listing of IP address ranges to the quarantine pool to detect any matches; and remove any IP address ranges from the quarantine pool based on the matches.

20. A computer implemented method for automatic IP address range allocation implemented using at least one processor, the method comprising:

storing, in one or more storage devices, an availability map of IP addresses including a pointer to a next available IP address range of a first size;

receiving, from a requestor computer device, a request for an IP address range of the first size;

selecting the next available IP address range of the first size based on the pointer;

moving the pointer to another available IP address range of the first size if the selected IP address range of the first size includes the next available IP address range of the first size;

placing the selected IP address range of the first size in a quarantine pool which includes a listing of IP addresses that are currently unavailable;

transmitting, to the requestor computer device, the selected IP address range of the first size;

determining a listing of IP address ranges that are currently in use;

updating the availability map of IP addresses based on the listing of IP address ranges;

comparing the listing of IP address ranges to the quarantine pool to detect any matches; and removing any IP address ranges from the quarantine pool based on the matches.

* * * * *